United States Patent Office 3,761,382
Patented Sept. 25, 1973

3,761,382
APPARATUS FOR GENERATING, PURIFYING AND DELIVERING HYDROGEN FOR ANALYZERS AND THE LIKE
James C. Hammond, Charles D. Jamerson, Jr., and Michael E. Kiefer, Raleigh, N.C., assignors to Trienco, Inc., Raleigh, N.C.
Filed June 21, 1972, Ser. No. 264,957
Int. Cl. B01k 3/10
U.S. Cl. 204—266     9 Claims

ABSTRACT OF THE DISCLOSURE

Hydrogen and oxygen are generated by electrolytic disassociation of water in a unitary apparatus having means to purify and regulate the delivery of the hydrogen and to control the generation. The oxygen produced is discharged to atmosphere under controlled pressure regulation. The hydrogen produced is fed to a separate temperature controlled palladium purifier assembly having an ultrapure hydrogen output useful in analytical apparatus and the like and an output of gas impurities which is discharged to atmosphere under controlled pressure.

BACKGROUND OF THE INVENTION

(1) Field of the invention

The invention relates to electrolysis apparatus for generating hydrogen. More particularly, the apparatus of the invention is concerned with a unitary apparatus having means to generate, purify, and safely control the generation of hydrogen as well as safely control the generation of oxygen.

(2) Description of the prior art

It has long been known to disassociate water by electrolysis to obtain hydrogen and oxygen. It has also long been known that a palladium wall will pass hydrogen in ionic form and will allow the hydrogen to recombine into molecular form so as to purify gases which include hydrogen as a constituent to obtain pure hydrogen. A number of hydrogen generators which use electrolytic action and palladium tube purifiers are on the market. However, so far as is known, the prior art has not produced a unitary, portable apparatus having a generator unit, a purification unit, a water supply and pump unit and related controls for controlling both the generation and safety of both the hydrogen and the oxygen all in a common housing as a unitary structure. Prior art generators using palladium tube purifiers have used the palladium tube as the cathode which allows all of the positive ions in solution to migrate to the cathode to be reduced. Since only hydrogen ions pass through the palladium all other ions tend to form surface alloys on the palladium tube and therefore tend to rapidly reduce hydrogen permeability. This problem is particularly critical because of the expense of such tubing. More specifically, the prior art has not produced a hydrogen generator having an associated purifier in the same structure and automatic controls to regulate the start up purifier temperature and gas output to prevent the obtaining of an explosive temperature with respect to oxygen content in the purifier. Prior art hydrogen generators have also lacked satisfactory make-up water pumps and controls and have also required the use of special kinds of water and have generally not been adapted to use of any kind of municipal tap water.

SUMMARY OF THE INVENTION

The apparatus of the invention basically consists of a hydrogen generator unit, a hydrogen purifier unit, a water reservoir, a pump and associated electrical controls and valves which allow the apparatus to start and operate under safe conditions and to have a controlled output of ultrapure hydrogen, a waste discharge of the oxygen and a waste discharge of other impure hydrogen containing gases. Make-up water and generation are controlled according to consumption.

The generator unit is believed to be unique in being separate from the purifier unit thus the caustic solution is not exposed to the palladium purifier unit which means that the contents of the generator cannot pass directly into the purifier palladium filter. The generator is also characterized by having the oxygen electrode connected to a cylindrical perforated screen formed of nickle which surrounds an electrically insulating cylinder secured to the top of the generator vessel and having an open bottom end which mounts an asbestos tubular extension. Within the insulator cylinder and tubular extension the hydrogen electrode is mounted. On hydrogen demand the asbestos tube provides a relatively short electrical path between anode and cathode and thus less internal resistance and less heat. Oxygen is withdrawn from the generator through a pressure control valve and discharged to atmosphere as waste. Hydrogen combined with water, in an impure gas form, is directed to a palladium tube purifier assembly through solenoid and check valves. The hydrogen, under high pressure, surrounds a coiled hollow palladium tube having one end closed and one end open such that hydrogen ions pass through the palladium tube and the pure hydrogen, in molecular form, collects within the palladium tube under reduced pressure and is directed to a suitable point of use through pressure regulators and a shut-off valve. The generator also mounts a water level sensing electrode which controls operation of a low volume, high pressure pump. Means are also provided to sense the purifier temperature and water level and to use the sensed conditions as a means of establishing safe operating conditions.

DESCRIPTION OF THE PREFERRED EMBODIMENT

Figure 1:
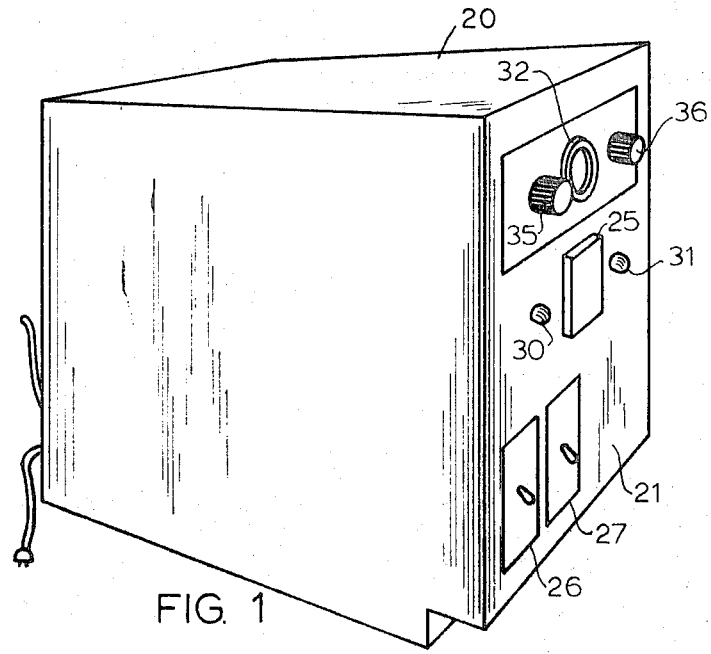
FIG. 1 is a perspective view of an apparatus incorporating the invention.
Figure 2:
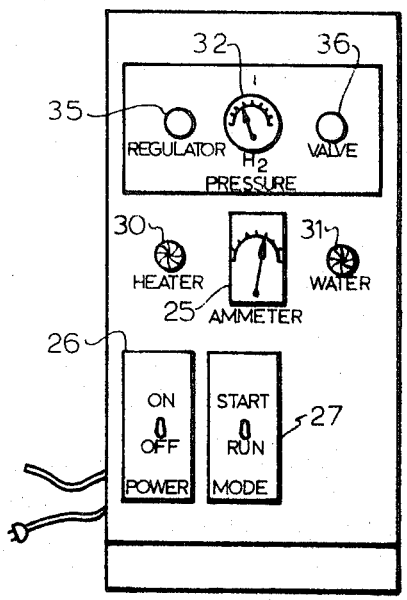
FIG. 2 is a front view of the apparatus showing the controls.

As seen in FIG. 1, all of the components of the apparatus constituting the invention are housed in a cabinet 20 having a front control panel 21. On panel 21 there is mounted an ammeter 25 which indicates the amount of current being drawn by the electrolytic generator 60, later described. Panel 21 also mounts a so-called power switch 26 having "off" and "on" positions and a mode switch 27 having "start" and "run" positions and whose switch operations are later explained. There is further mounted on panel 21 a heater signal lamp 30 which is energized whenever the purifier assembly is being heated as later discussed. A water signal lamp 31 is energized whenever water is being pumped. A pressure gauge 32 mounted on panel 21 indicates the outlet pressure of the purified hydrogen. A manually adjustable pressure regulator 35 on panel 21 controls the output pressure of the purified hydrogen and a manual valve 36 is employed to open and close the hydrogen output.

Figure 3:
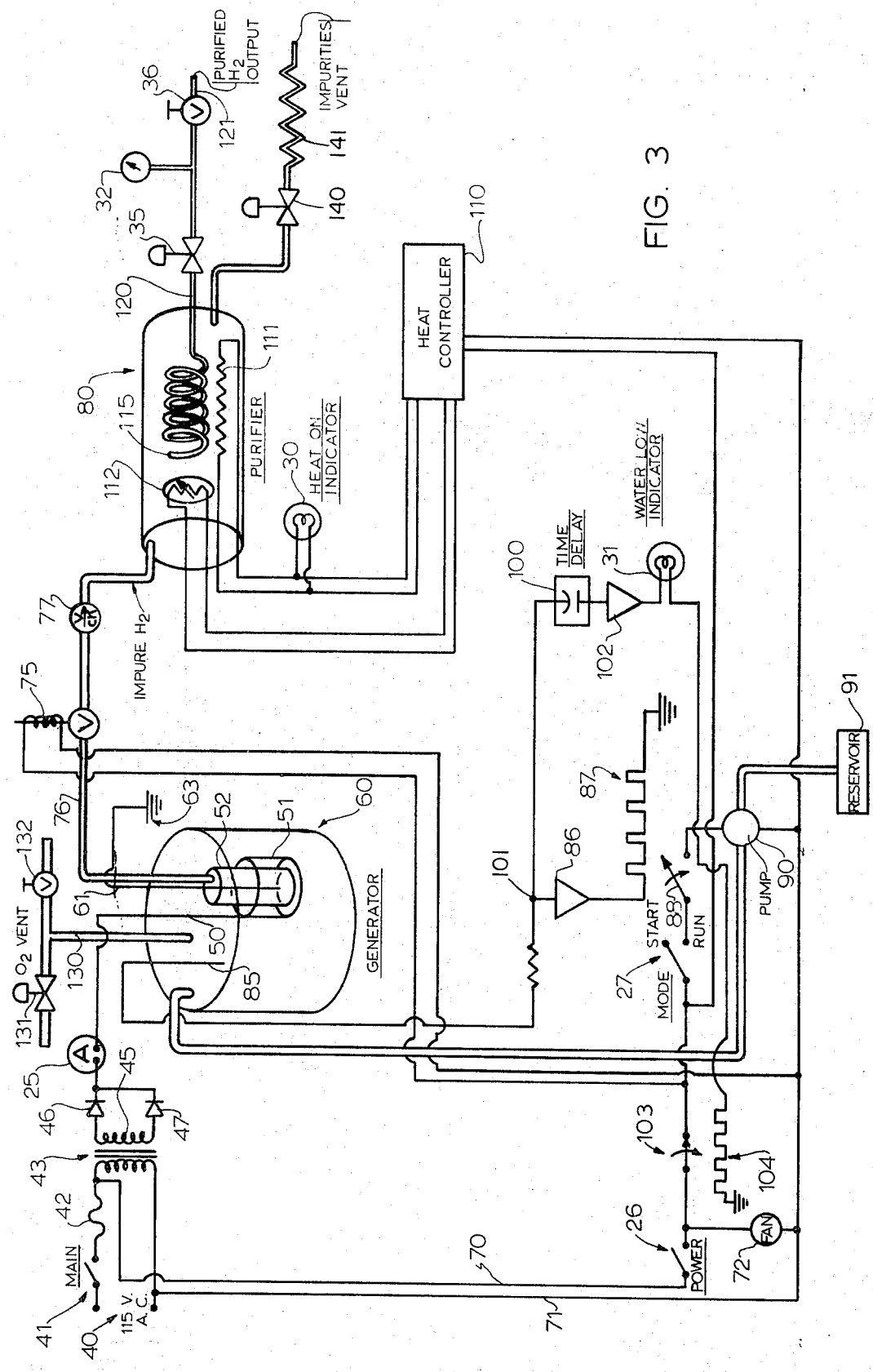
FIG. 3 is a schematic diagram of the apparatus.

Reference will next be made to FIG. 3 which illustrates in schematic form the electrical circuitry, the make-up water flow path and the generated gas paths. While the apparatus may be designed to operate from either an AC or a DC source it is generally more convenient to utilize an AC source and such is used for illustration. The AC source indicated at 40 connects through a main switch 41 having "off" and "on" positions and through a suitable thermal fuse 42 to a transformer 43. The secondary winding 45 connects through diodes 46, 47 to ammeter 25 and then to the electrode 50 which will be referred to as the oxygen electrode. Electrode 50 mounts a perforated, nickel, open ended, cylindrical screen 51 which surrounds an imperforate cylinder 52 whose bottom end is open and whose top end is secured to the top cover 55 of the generator 60 as later explained. Cylinder 52 is coated with a suitable rubber or other electrically insulating coating 54. With the insulating cylinder 52 there is mounted a second electrode 61, referred to as the hydrogen electrode. Electrode 61 is connected to ground as indicated at 63.

Figure 9:
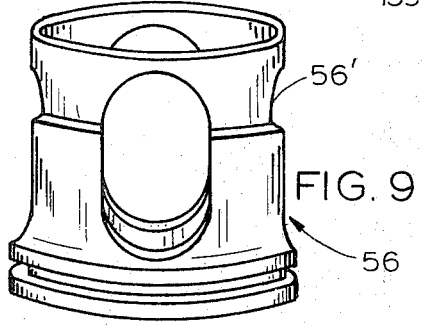
FIG. 9 is a perspective view of a perforate, cylindrical-shaped retainer employed to support the asbestos sleeve.

It will be noted that the lower end of cylinder 52 terminates intermediate the length of screen 51. The length of cylinder 52 is effectively extended by a perforate plastic, retainer sleeve 56 shown in FIG. 9. The reduced end portion 56' of sleeve 56 is received by the lower end of cylinder 52. A cylindrical, relatively tightly woven, asbestos sleeve 57 surrounds sleeve 56 and the lower portion of cylinder 52. Sleeve 57 is retained by means of suitable wire ties indicated at 64, 65 and 66 and is effectively no barrier to ion flow but a barrier to gas flow.

As will be better understood from later description, the employment of a supported asbestos sleeve in the manner just described means that when there is a relatively high consumption of hydrogen and the electrolyte level within cylinder 52 is relatively low there will be provided a relatively short electrical path between the oxygen electrode 50 and the hydrogen electrode 61 which passes directly through asbestos sleeve 57. Thus, there can be ion flow through sleeve 57 but no gas flow since asbestos sleeve 57 is woven of relatively tight construction so as to be impervious to gas flow. The shortened electrical path also means less resistance and therefore less internal heat at high levels of hydrogen consumption. At relatively low levels of hydrogen consumption the electrolyte level is relatively high in cylinder 52. In this case the electrical path between electrodes goes immediately below the lower end of cylinder 52 and sleeve 57 has little effect on internal heat.

Referring back to the primary side of transformer 43 it will be noted that leads 70, 71 are connected to the primary 43 and that power switch 26 connects to lead 70 with "off" and "on" positions. With switch 26 in the on position a cooling fan 72 is energized and which is suitably located in the cabinet 20 to provide a source of cooling air within the cabinet and particularly around generator 60 during operation. It will also be noted that a normally closed solenoid valve 75 is opened whenever power switch 26 is on and which thus allows any hydrogen generated and leaving generator 60 through outlet pipe 76 to flow through a check valve 77 and then to the hydrogen purified assembly 80. Upon a loss of power, valve 75 will, of course, close and lock the passage of hydrogen.

Figure 10:
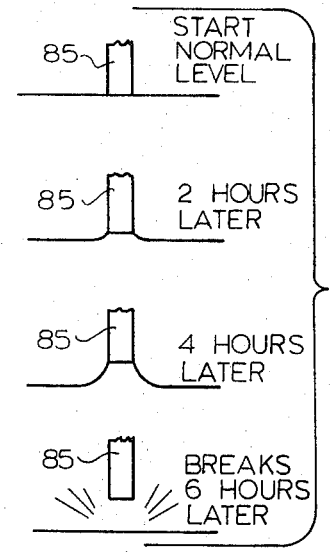
FIG. 10 illustrates schematically how the water level when descending tends to cling to the level electrodes for several hours before breaking.

To continue with the general description of the system of the invention, electrolyte level is detected by a level electrode 85 which connects through a current limiting resistor to a suitable amplifier or driver generally designated 86 and which passes current when the electrolyte is below some predetermined level, as indicated at L in FIG. 4, in generator 60 to cause a thermal relay 87 to close a normally open switch 88. Closing switch 88 starts pump 90 which draws water from a reservoir 91 and pumps the water to generator 60 through pipe 93 until the electrolyte level is restored to level L whereupon switch 88 again opens and causes pump 90 to stop. Thus, for a normal operation there is a cycling on and off of pump 90 according to the demands for make-up water from reservoir 91. As illustrated by FIG. 10, what actually happens is that the electrolyte typically tends to cling to level electrode 85 as the electrolyte level descends and may break and cause the pump to operate only at intervals of several hours. However, if when water is demanded for some reason reservoir 91 is dry, if pump 90 fails to pump or if for some other reason the electrolyte is not replenished with water in a normal time it is desirable to stop the entire process. In this regard it will be noted that a capacitive time delay 100 connects to junction 101 and tends to charge and to cause the amplifier or driver 102 to operate the thermal relay 104 and open switch 103 anytime there is a prolonged, unsatisfied demand for water. Opening of switch 103 acts to deenergize and close valve 75, to prevent operation of pump 90 and to remove power from the purifier heater controller section 110.

Controller 110 may take many of several electrical, electronic or electromechanical forms and is basically designed to control the energization of an electrical resistor heater 111 by means of temperature sensor which as shown comprises a thermistor sensor 112. Heater 111 in turn controls the temperature of a double coiled, bifiler helix, palladium tube 115 which acts as the hydrogen purifying device. Tube 115 has one end closed and one end connected to an outlet pipe 120 through manually adjustable pressure regulator 35 and manual valve 36 and to exhaust pipe 121 from which the desired ultrapure hydrogen is obtained for the particular operation in which it is to be employed. Instead of using a double coiled or bifiler helix, a single helical coil of palladium tubing may be used. Further details are given later concerning the construction of the purifier device.

To complete the generalized description of the system in reference to FIG. 3, it will be noted that the oxygen from generator 60 is discharged through a vent pipe 130 and a relief valve 131 to the atmosphere. Valve 131 on one embodiment has been set for a 200 p.s.i. nominal rating. A blow down is provided by the manually operated needle valve 132. A rupture disc 59 is set for a 350 p.s.i. nominal rating. The impure gases collected in the purifier assembly 80 are vented through a pressure regulator 140 and a restrictor 141 and then to atmosphere. The description will next turn to a more detailed description of the pump, the generator and purifier components and then to a more detailed description of the operation of the system.

With regard to the make-up water it should be understood that generator 60 operates under substantially high pressure, e.g. 200 pounds per square inch gauge and therefore requires a low discharge, high pressure pump. Thus, pump 90 must be of this character. In one embodiment a gear motor driven piston type pump has been employed with ball check valves mounted in a vertically positioned pumping chamber for pressure operation. This pump operates against a 200 pounds per square inch gauge head and pumps at a rate of approximately 5 milliliters per minute. However, any pump designed to operate within a comparable range of relatively high pressure and low discharge would be suited.

Figure 4:
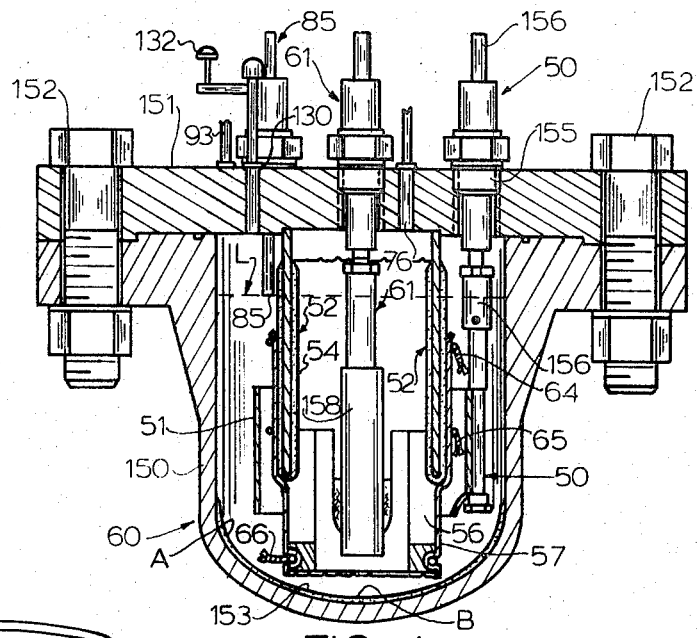
FIG. 4 is an elevation section view of the generator.
Figure 5:
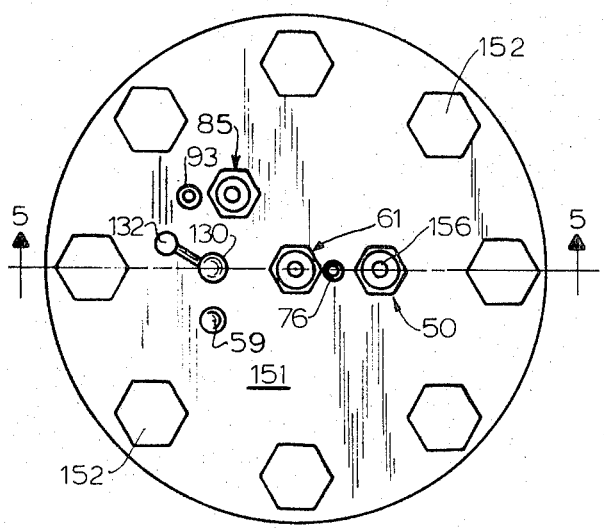
FIG. 5 is a plan view of the generator.

The generator 60 shown in FIGS. 4 and 5 is basically a corrosion resistant, e.g. stainless steel, pressure vessel mounting the associated electrolysis components. A lower somewhat cup shaped vessel 150 has a generally rounded bottom and mates with a cover member 151 to which it is rigidly secured by bolts 152. The interior of vessel 150 receives an epoxy, electrically insulating type coating indicated at 153. The coating 153 thus prevents generation of hydrogen in the area A (FIG. 4) and oxygen in the area B which would allow such oxygen to possibly mix with the hydrogen in the purifier and thus create a hazardous situation. Cover 151 mounts the make-up water inlet tube 93, the oxygen outlet tube 130, the hydrogen outlet tube 76, the oxygen electrode 50, the hydrogen electrode 61, the water level electrode 85 and a rupture disc 59. The upper mounting portions of each of the electrodes resemble a conventional internal combustion engine spark plug in construction. The oxygen electrode 50 includes an insulation portion 155 and a conducting rod portion 156 which mounts the cylindrical, open ended, perforate nickel screen 51 previously mentioned. The hydrogen electrode 61 mounts the conducting rod portion 158. The cylindrical insulator 52 is secured to the bottom surface cover 151. The upper interior portion of cylinder 52 provides a void or space in which the generated hydrogen collects and exits through the hydrogen outlet 76 whereas the oxygen collects and exits through the outlet 130. The ratio of the oxygen "chamber," i.e. the void outside cylinder 52, to the hydrogen chamber, i.e. the void inside cylinder 52 is about 4.6:1, or approximately 5. Thus, rapid changes in hydrogen demand have no material effect on the operation since a large change in the hydrogen chamber causes only a small change in the oxygen chamber.

Figure 6:
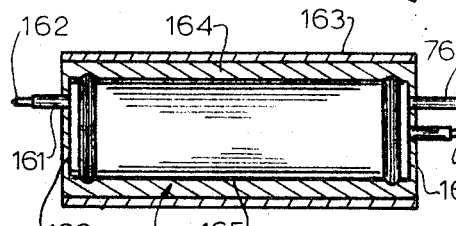
FIG. 6 is an elevation view of the purifier assembly.

Reference is next made to the hydrogen purifier assembly 80 whose purpose is to receive the impure hydrogen gases exiting from generator 60 and to filter from this the desired ultrapure hydrogen. Referring first to FIG. 6 the purifier assembly 80 includes an outlet end cap 160 which mounts a gas impurities outlet tube 161 and a restrictor tube 162. It is through tube 161 that the residue gases and water pass that are exhausted from the purifier assembly 80. The central cylindrical housing member 165 mounts on its opposite end another end cap member 166 which mounts the hydrogen tube 76 coming from generator 60 and also mounts the tube 120 through which the purified hydrogen is exhausted. End caps 160, 166 are secured by welding to the central housing 165. In order to provide heat insulation the purifier assembly is mounted in an open ended metal cylinder 163 and is surrounded by a suitable heat insulating cement 164. One such cement is sold as "Super Power House" cement by the Keen Corporation of Princeton, N.J.

Figure 7:
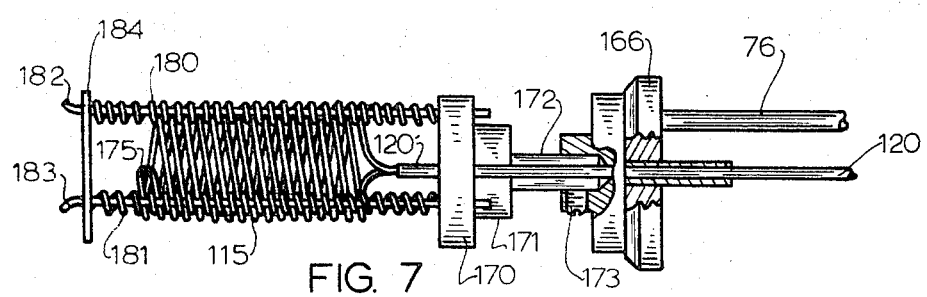
FIG. 7 is an elevation view of the palladium tube assembly used in the purifier.

FIG. 7 illustrates the manner in which the helical turns of the palladium tube 115 are mounted within the purifier assembly 80. In this regard end cap 166 mounts a cylindrical support member 170 by means of associated integral support members 171, 172 and which are held secure by set screw 173. Tube 115 has two parallel helical turns as shown and which extend helically from the closed end of tube 175 towards an interior portion 120' of tube 120 where a suitable connection is made such that both of the helical portions of tube 115 are placed in communication with tube 120. Remembering that the pressure external of tube 115 is substantially higher than internal of tube 115 it will be seen that any hydrogen that penetrates tube 115 will find its way to the purified hydrogen outlet tube 120 in which the substantially lower pressure prevails.

Referring back to FIG. 7 it will be noticed that a pair of coil springs 180, 181 mount on respective rods 182, 183 which terminate in a retainer disc 184 and are employed to retain the helical turns of tube 115 by catching the turns of tube 115 in the respective turns of the springs 180, 181. Thus, as expansion and contraction takes place in the turns of tube 115 the corresponding coils of springs 180, 181 expand and contract accordingly.

Figure 8:
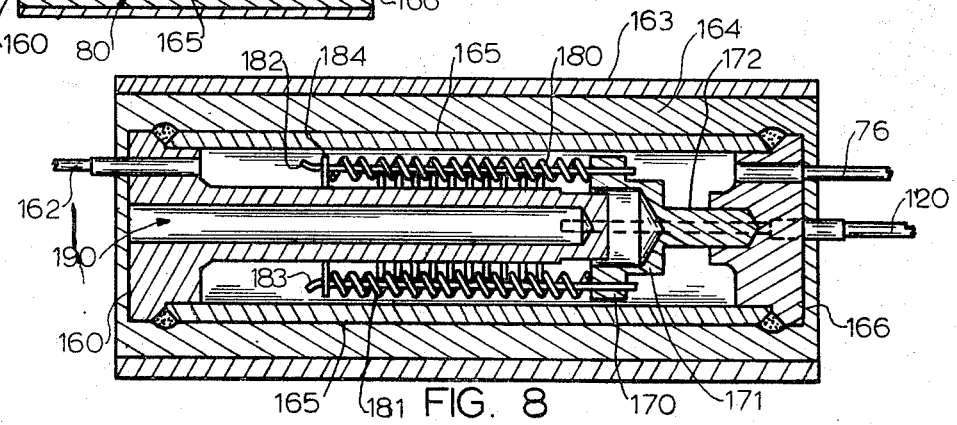
FIG. 8 is a cross section elevation view through the purifier assembly.

Mention has previously been made of the fact that the ability of a hollow palladium tube to filter hydrogen is temperature sensitive and the filtering action is much more apparent when the tube is heated. In connection with the prior description of FIG. 3 it was also mentioned that the tube 115 is heated by resistor 111 which is controlled by controller unit 110 according to temperature sensing provided by a thermistor 112. In this connection it will be seen in FIG. 8 that end cap 160 provides a well 190 and while not shown it is in this well that resistor 111 is received.

Prior to starting, the generator will be filled to a suitable level with water and a suitable electrolyte such as sodium hydroxide in a 15% caustic to 85% water solution. The apparatus is started by first closing the main switch 41 which energizes transformer 43 and places a DC voltage between the oxygen electrode 50 and the hydrogen electrode 61. If the starting electrolyte level is above the level of the level control electrode 82 a DC current tends to flow through electrode 85, through amplifier 86 and through the thermal relay 87 which tends to eat up and open switch 88. Pump 90 will be off and the purifier heating resistor 111 is off. Generator 60 begins to generate both hydrogen and oxygen. The hydrogen will enter the hydrogen outlet pipe 76 and will collect on the inlet side of now closed solenoid valve 75. Due to the difference in volumes of gas being generated and the smaller volume of space within the hydrogen generating portion, i.e. within insulator 52, the electrolyte level tends to move down within insulator 52 and the level tends to move up outside insulator 52 until a design pressure of 200 p.s.i.g. is achieved at which point the oxygen begins to be vented through oxygen outlet pipe 130 and through the pressure regulator 131. This method of venting the oxygen substantially reduces the amount of water that would otherwise be lost. There is also the possibility under this operating condition of the hydrogen pressure acting to force all of the electrolyte away from the hydrogen electrode 61. In this event the gas generation will cease because of loss of a liquid conducting path between the oxygen and hydrogen electrodes. The power switch 26 is next closed which acts to energize the cooling fan 72. Solenoid valve 75 is also energized and now opens and some of the impure generated hydrogen is bled from generator 60 through the check valve 77. The electrolyte level within the hydrogen generating space, i.e. within insulator 52, begins to rise due to the lowering of pressure and generation of both hydrogen and oxygen is resumed within generator 60.

One important aspect of the starting procedure which needs to be recognized at this stage concerns the matter of how the system responds to possible explosive conditions within the purifier 80. At the outset it is necessary to recognize that the palladium filtering tube 115 is required to be heated to approximately 280 degrees centigrade in order to operate at maximum efficiency. At the same time it is also necessary to recognize that oxygen reaches an explosive temperature at approximately 204 degrees centigrade. The invention deals with this problem by controlling the temperature in purifier 80 so that it rises slowly. The corresponding pressure increase decreases the partial pressure of the oxygen to a value below the upper explosive limit of oxygen in hydrogen.

With the foregoing in mind it can be said that the generator on start up starts forcing hydrogen and a hydrogen-water vapor into the interior of purifier 80 and surrounding the palladium tube 115. After approximately 60 minutes which allows the system to stabilize under the condition of the purifier being cold, i.e. unheated, the mode switch 27 is turned on which in turn causes the heat controller 110 to be energized. Controller 110 responds to the thermistor 112 which in turn monitors the temperature of purifier 80 and controls the energization of heating resistor 111. The indicating lamp 30 mounted on panel 21 indicates when the purifier is being heated. Controller 110 may take many forms but it is preferably of the on-off, time shared, proportional heating circuit type and such controls are readily available and well-known to those in the control art.

In the event there is a malfunction and for some reason water is not replenished over a long period of time, e.g. 30 to 45 minutes, the time delay capacitor 100 will charge sufficiently to drive amplifier 102 and actuate thermal relay 104 so as to open switch 103, shut down heating of purifier 80, close solenoid 75 and shut off pump 90.

Many advantages are derived from the system just described. One important advantage resides in the fact that the system lends itself to a wide range of electrolytes and furthermore does not depend on the use of pure, i.e. ionized water. Ordinary tap water in most locations will be found suitable. The fact that the purifier and generator are separate means that the caustic cannot ordinarily enter the purifier whereas in certain prior art devices where the palladium filtering tube is mounted directly in the generator housing this possibility does exist and in fact establishes a real hazard. The use of solenoid valve 75 acts to cut off the hydrogen output in the event of a power failure. Thus, the purifier is instantly deprived of hydrogen in the event of a power failure. The check valve 77 offers other advantages in that it prevents the accidental reverse flow of hot hydrogen if the pressure rupture disc 59 blows, if the operator opens the manual blowdown valve 132 without turning off the power or in the event of an initial expansion within the purifier as the purifier warms up. There is no requirement for a pressure surge tank as required in some of the prior art generators. Another advantage resides in the mode switch which allows the generator to be started prior to the pump. Thus, if the starting electrolyte level is relatively high but below the level electrode and the pump were to be started before the generator had built up internal hydrogen pressure, water, including the caustic electrolyte, could be pumped into the hydrogen outlet and purifier and thereby cause substantial damage. With the mode switch and the solenoid valve in the hydrogen outlet the generator can thus be shipped at least partially filled with the caustic solution. In another aspect of the purification operation it can be seen that once the purifier is pressurized and is operating there will be a constant purge of water vapor and nominal hydrogen the result of which is to prevent the building up of water vapor within the purifier. In this regard the pressure regulator 192 is set for a fixed flow of 20 cc. per minute and the restrictor tube 191 is in the nature of a capillary tube which acts to hold pressure back against regulator 192. Another advantage to be recognized resides in the fact that unlike prior art generators the present invention allows the current reading to be related directly to the hydrogen demand whereas the surge tank type generator does not have this capacity.

In regard to use of the asbestos sleeve 57 it may be noted that industrial hydrogen generators have used asbestos curtains between electrodes. However, such prior art generators have not used electrical energy to develop internal pressure as in the present invention but instead have used an external pump to develop system pressure. Further, such prior art generators do not vary the generation rate to match the demand. That is, the typical prior art industrial generator is either on or off and is either operating at full capacity or is off and all hydrogen demanding devices thus have to follow the state of the generator. Therefore, each consuming device has to either use the hydrogen, waste it or be used with a large surge drum. The invention thus provides an ultrapure hydrogen for use as the carrier gas in a gas chromatograph and like applications. The use of unwieldy cylinders or less pure hydrogen or helium is eliminated. The "sealed" oxygen venting system ensures freedom from contamination with atmospheric chemical and foreign materials.

What is claimed is:

1. In an electrolytic hydrogen and oxygen generator apparatus the combination of:

(a) a hydrogen-oxygen generator including a pressure tank having a cover secured thereon, said pressure tank adapted to contain an electrolytic solution including water and electrolyte, oxygen hydrogen electrode means mounted in said tank and having electrically conducting means extending through said cover, electrolyte level sensing electrode means mounted in said tank and extending through said cover, a water inlet mounted in said cover and respective appropriately positioned oxygen and hydrogen outlets in said cover for separately venting from said tank the produced oxygen and hydrogen including impurities mixed therewith;

(b) water supply means including a pump communicating on the discharge side with said water inlet and a reservoir adapted to contain make-up water communicating on the intake side with said pump, said pump being adapted to pump against the relatively high generated tank pressure and at a relatively low discharge rate;

(c) an alternating current source including current conversion means for providing a direct current output connected to energize said electrodes and thereby cause oxygen and hydrogen to be produced and flow to the respective generator oxygen and hydrogen outlets;

(d) a pressure regulator connected to said oxygen outlet and having a pressure setting adapted to preserve the tank pressure and being adapted to vent the generated oxygen including any impurities mixed therewith to atmosphere when pressurized in said tank at a pressure above said setting thereby avoiding the mixing of outside impurities with the oxygen remaining in the tank;

(e) electrical normally closed valve means communicating with said hydrogen outlet and electrically connected to said source whereby said valve means may be electrically energized and opened independent of and following electrical energization of said electrodes and startup of said hydrogen-oxygen generation;

(f) pump control means including a relay switch connected to be controlled by said level sensing electrode and controlling an electrical connection between said electrical source and said pump whereby upon the lowering of the electrolyte solution in said tank below some predetermined level said pump is energized and make-up water from said reservoir is pumped to restore said level;

(g) a purifier assembly including an elongated palladium purifying member providing a hollow elongated enclosed void, a closed pressure vessel providing an internal void surrounding and mounting said palladium purifying member therein and being connected to said generator hydrogen outlet whereby when said electrical valve means is open hydrogen gas including impurities mixed therewith is received from said generator at the pressure of said tank and enters said vessel in the internal void thereof to surround said palladium purifying member;

(h) a purified hydrogen gas outlet connected to communicate with said purifying member void and to provide an exhaust passage external of said vessel for purified hydrogen collected within said purifying member void, said purified gas outlet including a pressure regulator external of said vessel and having a pressure setting adapted to allow passage of said purified hydrogen from said void when pressure established within said void is in excess thereof;

(i) an impurities gas outlet connected to communicate with said vessel void surrounding said purifying member, said impurities gas outlet including flow regulator means whereby a regulated flow of impure gases from said vessel may be maintained while preserving the pressure of said vessel;

(j) electrical heating means connected to said source and including heat sensing and heater means and adapted to provide a controlled heating of said purifier vessel void whereby during start-up of said generator said vessel void is heated gradually and the partial pressure of the oxygen therein is controlled to avoid an explosive temperature thereof and after start-up and achieving of a substantially steady state operation of said generator, said purifier tube is maintained at a temperature designed to maximize the purification of hydrogen through said purifier member; and (k) a cabinet providing a housing, said generator, water supply means, current source, electrical valve means, pump control means, purifier assembly and electrical heating means being mounted in said housing to provide a self-contained unitary apparatus with the generation and purification components thereof in a common said housing.

2. In a hydrogen-oxygen generator apparatus as claimed in claim 1 including first manual electrical switching means connected to said source enabling said generator electrodes to be energized without energizing said electrical valve means, pump control means or heating means, second manual electrical switching means dependent on said first switching means being closed and enabling said electrical valve means to be energized without energizing said pump control means, third normally closed switch means enabling said electrical heating means to be energized when said second switching means is closed, said third switching means providing auxiliary level control and being relay controlled by the level of said electrolyte solution in said tank whereby to be opened upon a prolonged depletion thereof to render said second switching means inoperative to energize said heating means, a fourth manual switching means connected to receive current from said third switching means, and a fifth relay switching means controlled by said level sensing electrode for primary level control and being adapted conditioned upon said fourth switch being closed, to close and electrically energize said pump to restore a proper level of make-up water to reopen upon said level being achieved.

3. In an apparatus as claimed in claim 1 wherein said hydrogen electrode includes an electrically conducting vertical rod suspended in said tank in electrical insulation with and from said cover, said oxygen electrode includes an electrically conducting rod suspended in said tank in electrical insulation with and from said cover and an open ended cylindrical screen electrically connected to and supported from said oxygen electrode rod and surrounding said hydrogen electrode, a metal cylinder suspended from said cover and having an open end terminating above the lower end of said rod, said metal cylinder being vertically positioned in spaced relation between said oxygen electrode screen and said hydrogen electrode rod and having electrical insulation means on both sides thereof and an auxiliary cylindrical sleeve member mounted on the lower end and forming an extension of said metal cylinder to surround the lowermost portion of said hydrogen electrode rod, said auxiliary sleeve member being impervious to gases formed in said generator while being pervious to ion flow thereby providing a relatively short electrical path between said electrodes during periods of relatively high hydrogen consumption.

4. In an apparatus as claimed in claim 1 whereby said purifying member comprises a coiled palladium tube.

5. In an apparatus as claimed in claim 1 including means effective to separate said electrodes and establish within said tank an oxygen storage chamber and a hydrogen storage chamber with said oxygen chamber being approximately five times as large in volume as the hydrogen chamber.

6. In a hydrogen-oxygen apparatus as claimed in claim 1 including a manual control valve mounted to control flow of said purified gas from said purified gas pressure regulator and wherein said impurities gas outlet flow regulator means comprises a pressure regulator and flow restrictor means and said restrictor means provides a back pressure against the said impurities gas pressure regulator.

7. In a hydrogen-oxygen generator apparatus as claimed in claim 6 including first manual electrical switching means connected to said source enabling said generator electrodes to be energized without energizing said electrical valve means, pump control means or heating means, second manual electrical switching means dependent on said first switching means being closed and enabling said electrical valve means to be energized without energizing said pump control means, third normally closed switch means enabling said electrical heating means to be energized when said second switching means is closed, said third switching means providing auxiliary level control and being relay controlled by the level of said electrolyte solution in said tank whereby to be opened upon a prolonged depletion thereof to render said second switching means inoperative to energize said heating means, a fourth manual switching means connected to receive current from said third switching means, and a fifth relay switching means controlled by said level sensing electrode for primary level control and being adapted conditioned upon said fourth switch being closed, to close and electrically energize said pump to restore a proper level of make-up water and to reopen upon said level being achieved.

8. In an apparatus as claimed in claim 6 wherein said hydrogen electrode includes an electrically conducting vertical rod suspended in said tank in electrical insulation with and from said cover, said oxygen electrode includes an electrically conducting rod suspended in said tank in electrical insulation with and from said cover and an open ended cylindrical screen electrically connected to and supported from said oxygen electrode rod and surrounding said hydrogen electrode, a metal cylinder suspended from said cover and having an open end terminating above the lower end of said rod, said metal cylinder being vertically positioned in spaced relation between said oxygen electrode screen and said hydrogen electrode rod and having electrical insulation means on both sides thereof and an auxiliary cylindrical sleeve member mounted on the lower end and forming an extension of said metal cylinder to surround the lowermost portion of said hydrogen electrode rod, said auxiliary sleeve member being impervious to gases formed in said generator while being pervious to ion flow thereby providing a relatively short electrical path between said electrodes during periods of relatively high hydrogen consumption.

9. In an apparatus as claimed in claim 6 wherein said purifying member comprises a coiled palladium tube.

References Cited
UNITED STATES PATENTS
3,448,035  6/1969  Serfass _____ 204—272

JOHN H. MACK, Primary Examiner
W. I. SOLOMON, Assistant Examiner

U.S. Cl. X.R.
55—158; 204—129, 260; 417—36

UNITED STATES PATENT OFFICE
CERTIFICATE OF CORRECTION

Patent No. 3,761,382            Dated September 25, 1973

Inventor(s) James C. Hammond, Charles D. Jamerson, Jr. and Michael E. Kiefer

It is certified that error appears in the above-identified patent and that said Letters Patent are hereby corrected as shown below:

Col. 3, line 23, "with" should be -within-.

Col. 3, line 69, "lock" should be -block-.

Col. 6, line 18, "eat" should be -heat-.

Col. 7, line 69, the first appearance of "or" should be -of-.

Col. 8, line 4, -and- should be inserted between "oxygen" and "hydrogen".

Signed and sealed this 17th day of September 1974.

(SEAL)
Attest:

McCOY M. GIBSON JR.
Attesting Officer

C. MARSHALL DANN
Commissioner of Patents